United States Patent
Nakamura

(10) Patent No.: US 10,142,517 B2
(45) Date of Patent: Nov. 27, 2018

(54) IMAGE FORMING APPARATUS, PRINT SYSTEM, METHOD FOR CONTROLLING IMAGE FORMING APPARATUS, METHOD FOR CONTROLLING PRINT SYSTEM, AND STORAGE MEDIUM STORING PROGRAM

(71) Applicant: CANON KABUSHIKI KAISHA, Tokyo (JP)

(72) Inventor: Tadahiro Nakamura, Kashiwa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/443,895

(22) Filed: Feb. 27, 2017

(65) Prior Publication Data

US 2017/0257526 A1   Sep. 7, 2017

(30) Foreign Application Priority Data

Mar. 1, 2016 (JP) .................................. 2016-038736

(51) Int. Cl.
H04N 1/00 (2006.01)
H04N 1/44 (2006.01)
H04N 1/327 (2006.01)

(52) U.S. Cl.
CPC ....... *H04N 1/4433* (2013.01); *H04N 1/00344* (2013.01); *H04N 1/00477* (2013.01); *H04N 1/32765* (2013.01); *H04N 2201/0094* (2013.01)

(58) Field of Classification Search
None
See application file for complete search history.

(56) References Cited

U.S. PATENT DOCUMENTS

| | | | | |
|---|---|---|---|---|
| 2006/0244995 A1* | 11/2006 | Kushida | ................ | G06F 3/1207 358/1.15 |
| 2010/0053674 A1* | 3/2010 | Kano | ................ | H04N 1/00204 358/1.15 |
| 2011/0267647 A1* | 11/2011 | Kamasuka | ............ | G06F 3/1203 358/1.15 |
| 2013/0176595 A1* | 7/2013 | Yamada | ................ | G06F 3/1222 358/1.16 |
| 2015/0092233 A1* | 4/2015 | Park | ...................... | G06F 3/1288 358/1.15 |
| 2015/0264210 A1* | 9/2015 | Ono | ................... | H04N 1/00904 358/1.13 |

(Continued)

FOREIGN PATENT DOCUMENTS

| | | |
|---|---|---|
| JP | 201554412 A | 3/2015 |
| JP | 2015165394 A | 9/2015 |
| JP | 5843691 B2 | 1/2016 |

*Primary Examiner* — Fan Zhang
(74) *Attorney, Agent, or Firm* — Canon U.S.A., Inc. IP Division

(57) ABSTRACT

An image forming apparatus capable of communicating with an external device which manages print data includes an operating unit and a controller. The operating unit receives a user operation of an operating user. The controller includes circuitry or a processor to execute instructions stored in a memory to acquire unacquired print data from the external device based on a receiving process performed first after start-up of the image forming apparatus among a plurality of receiving processes including a first receiving process for receiving a notification which encourages acquisition of print data and a second receiving process for receiving the user operation by the operating unit.

17 Claims, 12 Drawing Sheets

(56) References Cited

U.S. PATENT DOCUMENTS

2016/0134764 A1* 5/2016 Oguma ................ G06F 3/1239
                                                    358/1.14
2017/0134615 A1* 5/2017 Onose .................. H04N 1/4413

* cited by examiner

FIG. 5

| PRINTER ID 501 | PRINTER NAME 502 | PERMITTED USER 503 | STATUS 504 | CONNECTION ID 505 | CAPABILITY 506 |
|---|---|---|---|---|---|
| 101 | printer1 | User1<br>User2<br>User3 | ONLINE | 10001 | COLOR: OK<br>DOUBLE-SIDE: OK<br>SHEET SIZE: A4, LETTER |
| 201 | printer2 | User1<br>User3 | OFFLINE | 10010 | COLOR: NG<br>DOUBLE-SIDE: OK<br>SHEET SIZE: A4, A3 |
| 301 | printer3 | User3<br>User4 | ONLINE | 10020 | COLOR: OK<br>DOUBLE-SIDE: OK<br>SHEET SIZE: A4, A3 |

FIG. 6

| USER NAME | PASSWORD | AVAILABLE PRINTER |
|---|---|---|
| User1 | XXXX | printer1<br>printer2 |
| User2 | XXXX | printer1 |
| User3 | XXXX | printer1<br>printer2<br>printer3 |
| User4 | XXXX | printer3 |

FIG. 7

| JOB ID | JOB NAME | USER NAME | PRINTER ID | ticketURL | downloadURL | STATUS |
|---|---|---|---|---|---|---|
| 1 | aaa.doc | User1 | 101 | https://www.canon.com/print/ticket/1 | https://www.canon.com/print/download/1 | PRINT FINISH |
| 2 | bbb.pdf | User3 | 201 | https://www.canon.com/print/ticket/2 | https://www.canon.com/print/download/2 | PRINTING |
| 3 | ccc.jpg | User2 | 101 | https://www.canon.com/print/ticket/3 | https://www.canon.com/print/download/3 | SPOOLING |

```
{
 "jobs": [
  {
   "id": "101",
   "jobname": "test.doc",
   "user": "User1",
   "status": "queued",
   "ticketURL": "https://www.canon.com/ticket/1",
   "downloadURL": "https://www.canon.com/download/1",
    :
  },
  {
   "id": "102",
   "jobname": "aaa.pdf",
   "user": "User1",
   "status": "queued",
   "ticketURL": "https://www.canon.com/ticket/2",
   "downloadURL": "https://www.canon.com/download/2",
    :
  }
 ]
}
```

IMAGE FORMING APPARATUS, PRINT SYSTEM, METHOD FOR CONTROLLING IMAGE FORMING APPARATUS, METHOD FOR CONTROLLING PRINT SYSTEM, AND STORAGE MEDIUM STORING PROGRAM

BACKGROUND OF THE INVENTION

Field of the Invention

This disclosure relates to an image forming apparatus which performs cloud printing, a print system, a method for controlling an image forming apparatus, a method for controlling a print system, and a program.

Description of the Related Art

Cloud printing which is a technology that allows a user to print via a server on a cloud is widely used. Cloud printing allows a user to print on an image forming apparatus in an office, for example, from outside the office via the internet. For security reasons, a Firewall is generally installed between a LAN of the office and the Internet to block a connection of an apparatus on the side of the Internet to an apparatus on the side of the office.

In cloud printing, the image forming apparatus in the office connects with a cloud server, and the connection is kept as an always-on connection. When a print job is submitted, the cloud server notifies the image forming apparatus of the submission of the print job using the connection, and the image forming apparatus acquires the print job from the cloud server upon receipt of the notification, whereby printing from the apparatus on the side of the Internet becomes possible.

Japanese Patent Laid-Open No. 2015-54412 proposes a technology that operates in cloud printing by switching a mode in which an image forming apparatus receives a notification from a cloud server and acquires a job from the cloud server, and a mode in which the image forming apparatus acquires a job in accordance with a user operation without receiving a notification from the cloud server.

However, because two modes are switched in operation, the technology proposed in Japanese Patent Laid-Open No. 2015-54412 has issues. For example, in the mode in which the image forming apparatus acquires a job in accordance with a notification from the server, the job cannot be received unless a notification is received. In this regard, there are situations where no notification is transmitted from a server.

A situation where no notification is transmitted from a server is that, for example, the server does not satisfy notification conditions, such as a notification period. In a server which issues notifications at a constant period, no notification is issued until predetermined timing comes. Therefore, the image forming apparatus needs to wait for receiving a job until a notification is acquired.

A situation where no notification is transmitted from a server is that, for example, the server and the image forming apparatus cannot communicate temporarily. In the server which issues a notification to the image forming apparatus at timing at which a job is submitted from the client terminal, the notification cannot be normally completed with respect to the image forming apparatus which is powered off at this timing. Therefore, the image forming apparatus cannot receive a notification nor receive a job.

Another situation where no notification is transmitted from a server is that, for example, the notification is already completed. A situation where the notification is completed whereas printing is not completed may be created if the printing is interrupted due to, for example, powering-off of the image forming apparatus during downloading of the job after the notification is received from the server. In this situation, no more notification is issued because issuance of the notification is normally completed by the server. Therefore, the job cannot be received.

Then, an image forming apparatus capable of acquiring a print job in accordance with a notification from a server and also acquiring a print job upon request from the image forming apparatus is appropriate.

Especially when a print job is acquired upon request from the image forming apparatus, the print job is acquirable in accordance with a user operation. If a print job is received at timing not intended by a user and printing is started, the user may forget to take a printed matter.

SUMMARY OF THE INVENTION

An embodiment provides an image forming apparatus capable of acquiring print data from a server in accordance with a notification and also capable of acquiring print data from a server in accordance with an operation of a user.

According to an aspect of the present invention, an image forming apparatus capable of communicating with an external device which manages print data includes an operating unit which receives a user operation of an operating user, and a controller having circuitry or a processor configured to execute instructions stored in a memory to: acquire unacquired print data from the external device based on a receiving process performed first after start-up of the image forming apparatus among a plurality of receiving processes including a first receiving process for receiving a notification which encourages acquisition of print data and a second receiving process for receiving the user operation by the operating unit.

Further features of the present invention will become apparent from the following description of embodiments with reference to the attached drawings.

BRIEF DESCRIPTION OF THE DRAWINGS

FIG. 5 illustrates printer information managed by a printer management unit.

FIG. 6 illustrates user information managed by a user management unit.

FIG. 7 illustrates job information managed by a job management unit.

DESCRIPTION OF THE EMBODIMENTS

Hereinafter, embodiments will be described with reference to the drawings.

First Embodiment

Figure 1:
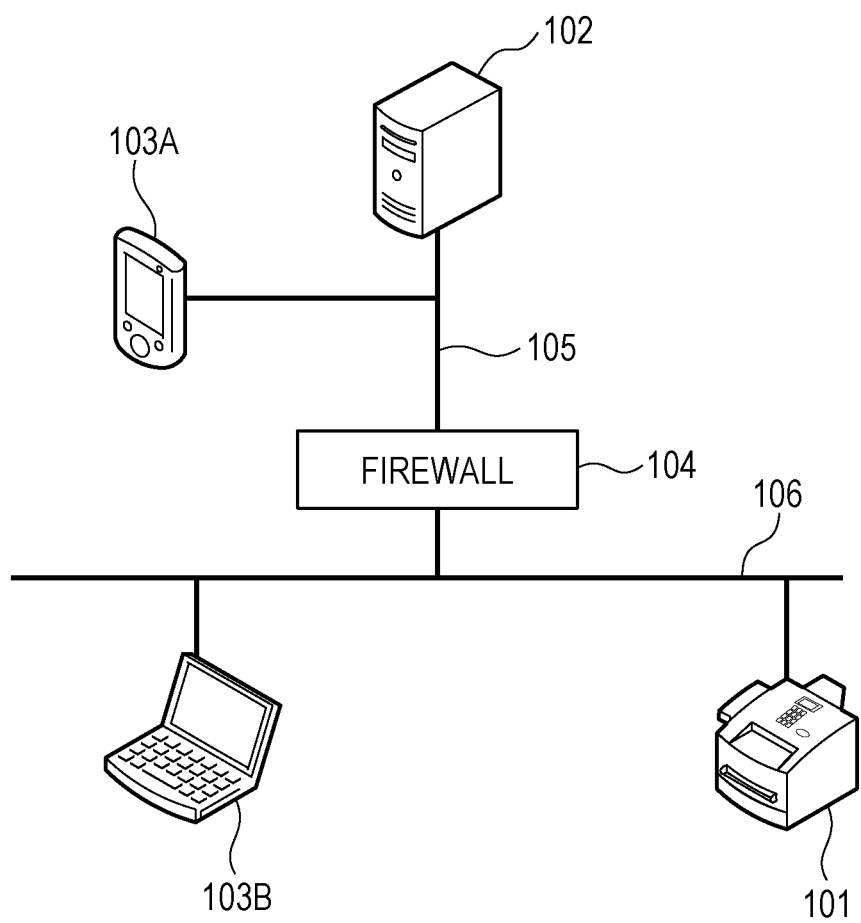
FIG. 1 illustrates a configuration of a print system according to a first embodiment.

FIG. 1 illustrates a configuration of a print system according to an embodiment.

As illustrated in FIG. 1, an image forming apparatus 101 is connected with a LAN 106 and can communicate with a client terminal 103B on the LAN 106. The image forming apparatus 101 can communicate with a cloud server 102 on the Internet 105 via a Firewall 104.

The cloud server 102 exists on the Internet 105 and operates as a print server which receives a print job from client terminals 103A and 103B and stores the print job, and transmits the print job to the image forming apparatus 101 in response to a request from the image forming apparatus 101.

The client terminals 103A and 103B are information devices which transmit a print job to the cloud server 102 in response to a print command by a user. The client terminals 103A and 103B may be a smartphone, a tablet type computer, a personal digital assistant (PDA), a personal computer (PC), etc. The client terminals 103A and 103B are the same except that the client terminal 103A is connected with the Internet 105 and the client terminal 103B is connected with the LAN 106. Therefore, these client terminals 103A and 103B will be collectively denoted by the reference numeral 103 hereinafter.

The Firewall 104 is provided between the Internet 105 and the LAN 106 to refuse connection from devices on the side of the Internet 105 to devices on the side of the LAN 106.

Figure 2:
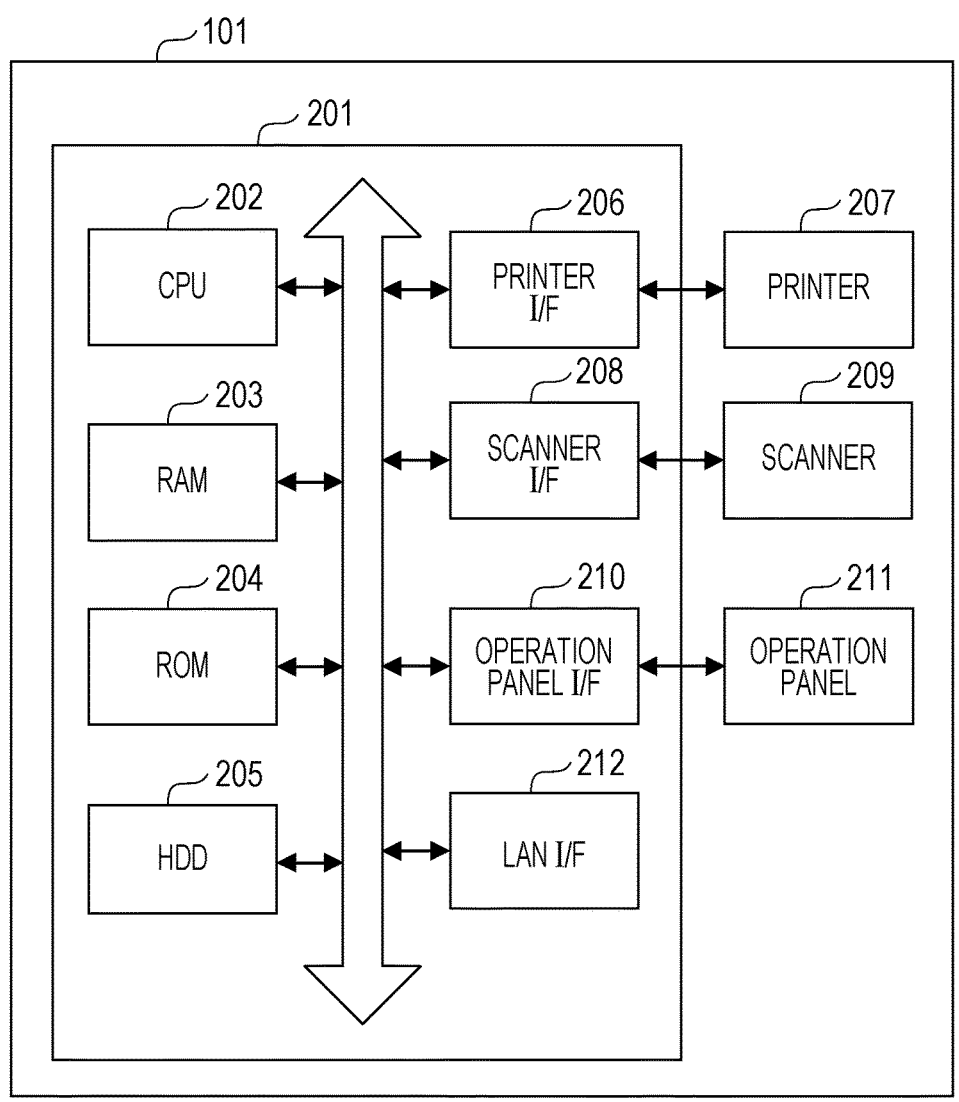
FIG. 2 is a hardware configuration diagram of the image forming apparatus.

FIG. 2 illustrates a hardware configuration of the image forming apparatus 101. The image forming apparatus 101 is described as a multi-functional peripheral in the present embodiment, but the image forming apparatus 101 may be a printer.

In FIG. 2, the control unit (a controller) 201 including a CPU 202 controls an operation of the entire image forming apparatus 101. The CPU 202 reads a control program stored in the ROM 204 and performs various types of control, such as communication control. RAM 203 is used as a temporary area, such as main memory and a work area, of the CPU 202. A HDD 205 stores data, various programs, or various information tables. Other storage device, such as a solid state drive (SSD), may be provided instead of or in addition to the HDD.

A printer I/F (interface) 206 connects a printer 207 (a printer engine) and the control unit 201 to communicate with each other. The printer 207 performs print processing in accordance with print data input via the printer I/F 206 on a sheet fed from a sheet feed cassette (not illustrated). A scanner I/F 208 connects a scanner 209 and the control unit 201 to communicate with each other. The scanner 209 reads a document placed on a document scanning platen and generates image data. The image data generated in the scanner 209 can be used in printing in the printer 207, can be stored in the HDD 205, and can be transmitted to an external device via a wireless LAN I/F 212 or a wired LAN 213.

An operation panel I/F 210 connects an operation panel 211 and the control unit 201 to communicate with each other. The operation panel 211 includes a liquid crystal display unit having a touch panel function, a keyboard, various function keys, etc. A user can acquire various types of information by checking a screen displayed on the operation panel 211. The user can input various instructions to the image forming apparatus 101 using the touch panel.

The LAN I/F 212 permits wireless/wired communications with an external information processing apparatus, such as a portable terminal and a PC. With the wireless/wired communications, the image forming apparatus 101 can receive print data from the information processing apparatus, and the printer 207 can perform print processing in accordance with the received print data. Further, image data generated by the scanner 209 can be transmitted to an external information processing apparatus. Although a single CPU 202 performs each processing illustrated in a later-described flowchart using single memory (the RAM 203) in the image forming apparatus 101 of the present embodiment, other embodiments may be implemented. For example, each processing illustrated in the later-described flowchart may be performed in cooperation of a plurality of CPUs and a plurality of memories.

Figure 14:
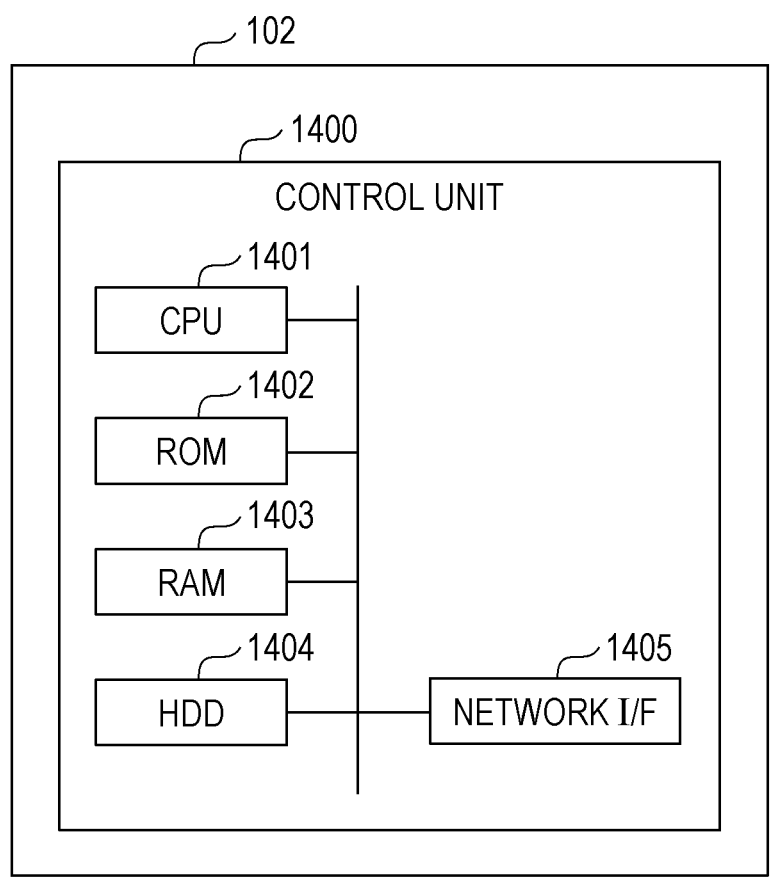
FIG. 14 is a hardware configuration diagram of a cloud server.

FIG. 14 is a block diagram of a hardware configuration of the cloud server 102.

In FIG. 14, a control unit 1400 including a CPU 1401 controls an operation of the entire cloud server 102. ROM 1402, a HDD 1404 and RAM 1403, and a network interface (a network I/F) 1405, etc. are connected with the CPU 1401 via a system bus.

The CPU 1401 reads a control program stored in the ROM 1402, the HDD 1404, etc. and performs various control processes. The RAM 1403 is used as a temporary storage area, such as main memory and a work area, of the CPU 1401. The HDD 1404 stores various programs and various types of data, such as job information, print attributes, and image data. Other storage device, such as a SSD, may be provided instead of or in addition to the HDD.

A network I/F 1405 is an interface for connecting the control unit 1400 to the Internet 105. The network I/F 1405 transmits and receives various types of information to and from other apparatus (for example, the image forming apparatus 101) via the Internet 105.

The cloud server 102 may be constituted by a plurality of computers.

Figure 3:
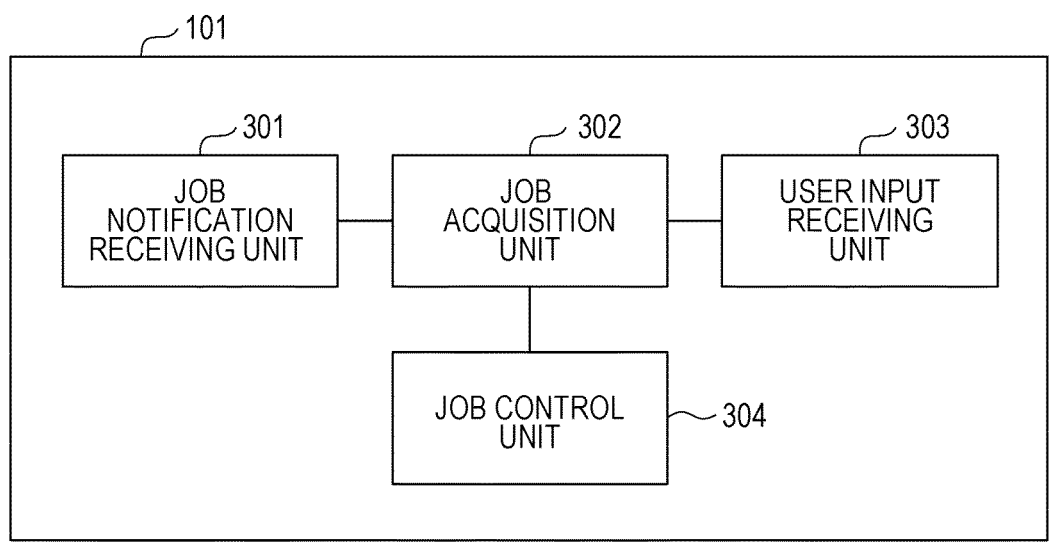
FIG. 3 is a software configuration diagram of an image forming apparatus according to the first embodiment.

FIG. 3 illustrates a software configuration of the image forming apparatus 101 in the first embodiment. Each function part illustrated in FIG. 3 is implemented when the CPU 202 executes the control program stored in the ROM 204 and the HDD 205.

When the image forming apparatus 101 is powered on (when the image forming apparatus 101 is started up), a job notification receiving unit 301 establishes a connection with a job notification transmitting unit 404 in the cloud server 102. The job notification receiving unit 301 maintains the connection and receives a job notification from the cloud server 102. A standard technique of establishing an always-on connection between a client and a server and permitting sending a notification from the server is Extensible Messaging and Presence Protocol (XMPP). The client and the server may communicate with each other by other communication technology. Upon receipt of a job notification from the cloud server 102, the job notification receiving unit 301 transmits job notification information to a job acquisition unit 302.

When a predetermined user operation is performed on the operation panel 211 or a later-described remote UI, a user input receiving unit 303 receives user input from the operation panel 211 or the LAN I/F 212 and transmits user input information to the job acquisition unit 302.

Upon receipt of the job notification information or the user input information, the job acquisition unit 302 transmits a print job acquisition request to the cloud server 102 and, if a print job exists in the cloud server 102, the job acquisition unit 302 receives the print job from the cloud server 102, and transmits the received print job to the job control unit 304. The job control unit 304 controls so that the print job received from the job acquisition unit 302 is interpreted and rasterized, and then printed in the printer 207.

Figure 4:
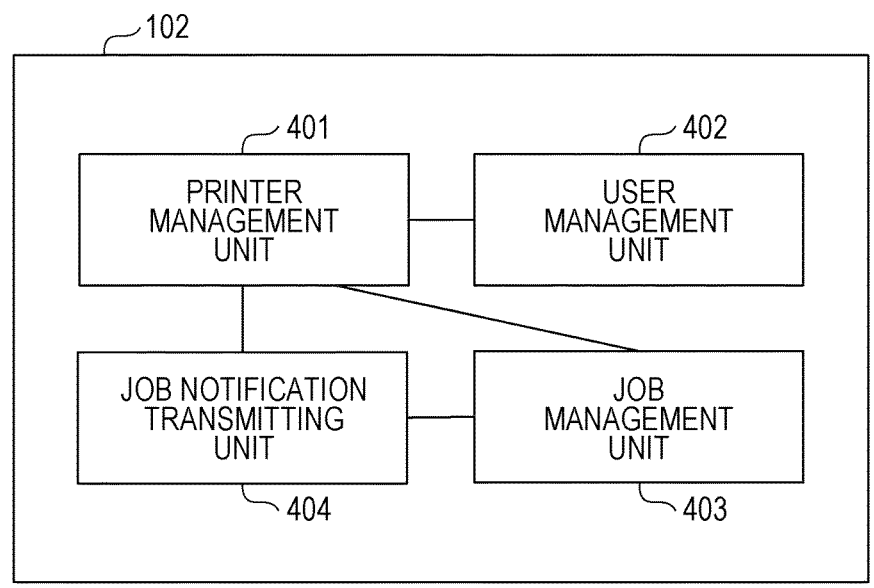
FIG. 4 is a software configuration diagram of a cloud server.

FIG. 4 is a block diagram of a software configuration of the cloud server 102. Each function part illustrated in FIG. 4 is implemented when the CPU 1401 executes the control program stored in the ROM 1402 and the HDD 1404.

A printer management unit 401 manages printer information 500 illustrated in FIG. 5, and performs registration, deletion, and information update of printers, such as the image forming apparatus 101. A user management unit 402 manages user information 600 illustrated in FIG. 6, and performs registration, deletion, and information update of users. A job management unit 403 manages a print job submitted from the client terminal 103 in association with the printer as job information 700 of FIG. 7. A job notification transmitting unit 404 receives a connection request from the job notification receiving unit 301 of the image forming apparatus 101 and establishes a connection. The job notification transmitting unit 404 transmits a job notification to the job notification receiving unit 301 when a job is submitted to the image forming apparatus 101 while a connection is established with the image forming apparatus 101.

FIG. 5 illustrates printer information 500 managed by the printer management unit 401.

In the printer information 500, a printer ID 501 is a unique identifier assigned when the printer is registered. A printer name 502 is a printer name with which the user specifies the printer. A permitted user 503 is a list of users who can use the printer. The users are registered at initial installation of the printer. Users can be added later.

A status 504 is a current status of the printer. "Online" indicates available and "offline" indicates not available. The status 504 is "offline" in an initial state, and becomes "online" when an always-on connection described above is established between the image forming apparatus 101 and the cloud server 102. A connection ID 505 is an identifier of the established always-on connection. Capability 506 is capability information of the printer. The capability information includes, for example, whether color printing is possible and information about the sheet size applicable for printing.

FIG. 6 illustrates user information 600 managed by the user management unit 402.

In the user information 600, the reference numeral 601 denotes a user name and 602 denotes a password. An available printer 603 is an identifier of a printer which can be used by the user. When the user logs in the cloud server 102 from the client terminal 103 to perform printing, a name of a printer associated with the user in 603 is displayed as a name of an available printer.

FIG. 7 illustrates job information 700 managed by the job management unit 403.

In the job information 700, a job ID 701 is an identifier which identifies a job, and which is assigned whenever a job is submitted from the client terminal 103. A job name 702 is a name of a job. A user name 703 is a name of a user who submitted a job. A printer ID 704 is an identifier of a printer which prints a job. A ticketURL 705 is a URL with which a print attribute of a job can be acquired. A downloadURL 706 is a URL with which image data of a job can be acquired. A status 707 is a current status of a job, and indicates spooling, printing, print finish, etc.

Figure 8:
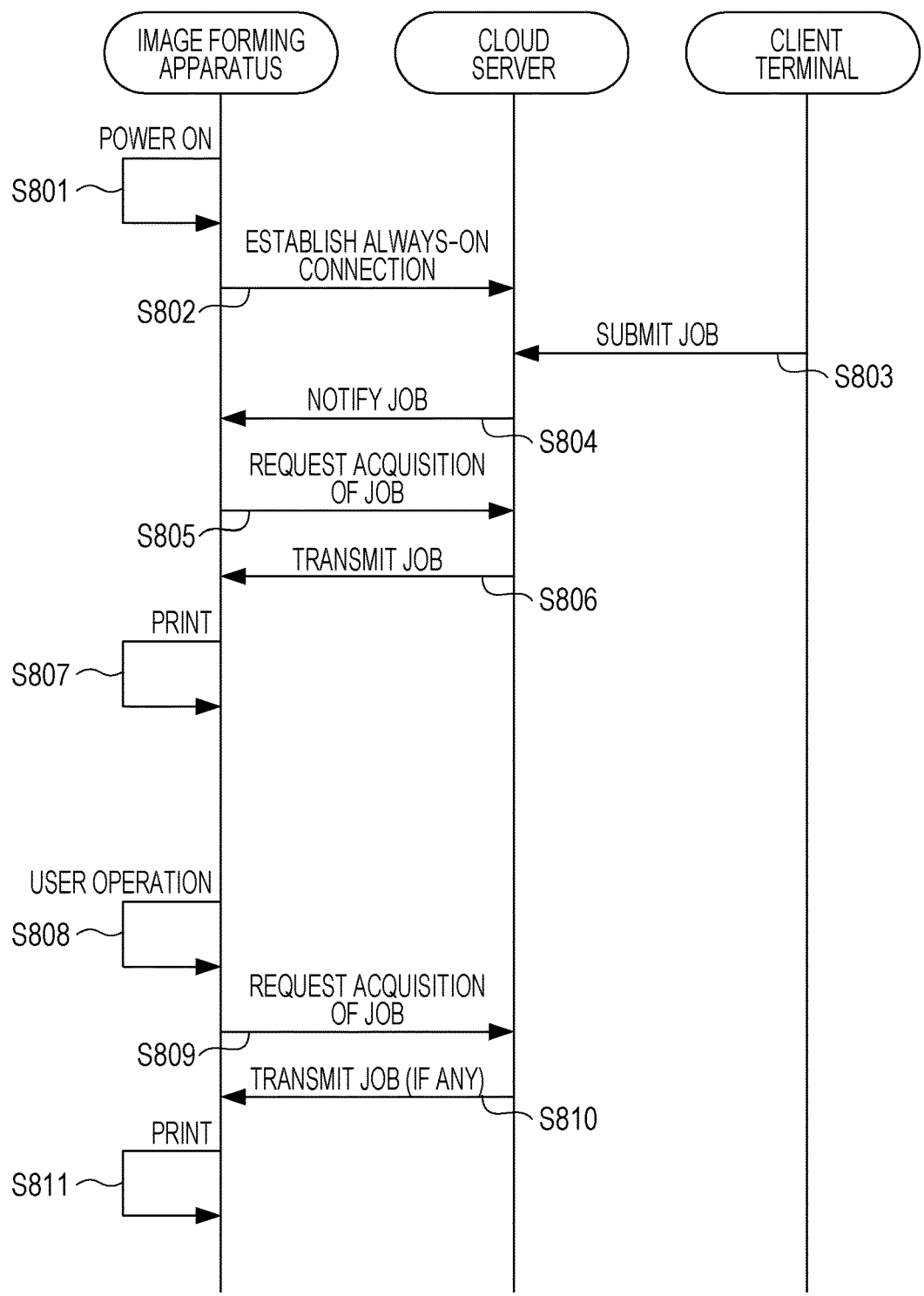
FIG. 8 illustrates a sequence of printing.

FIG. 8 illustrates a sequence of printing in the print system of the present embodiment. A process of the image forming apparatus 101 illustrated in FIG. 8 is implemented when the CPU 202 of the image forming apparatus 101 executes the control program stored in the ROM 204 and the HDD 205. A process of the cloud server 102 illustrated in FIG. 8 is implemented when the CPU 1401 of the cloud server 102 executes the control program stored in the ROM 1402 and the HDD 1404.

When the image forming apparatus 101 is powered on in S801, the image forming apparatus 101 establishes an always-on connection with the cloud server 102 in S802.

The client terminal 103 transmits a print job together with a printer identifier to the cloud server 102 in S803. Upon receipt of the print job, the cloud server 102 transmits a job notification to the image forming apparatus 101 in S804.

Upon receipt of the job notification transmitted from the cloud server 102, the image forming apparatus 101 transmits a print job acquisition request to the cloud server 102 in S805. In response to this request, the cloud server 102 transmits a print job to the image forming apparatus 101 in S806. Upon receipt of a print job transmitted from the cloud server 102, the image forming apparatus 101 prints the received job in S807.

Upon receipt of a predetermined user operation described later from the operation panel 211, etc., in S808, the image forming apparatus 101 transmits a print job acquisition request to the cloud server 102 in S809. In response to this request, the cloud server 102 transmits a print job to the image forming apparatus 101 in S810. Upon receipt of the print job transmitted from the cloud server 102, the image forming apparatus 101 prints the received job in S811.

In the description above, the client terminal 103 transmits a job to the cloud server 102 after establishing an always-on connection in S802, but the client terminal 103 may transmit a job before S802. In this case, S804 to S807 of the description above are not performed, but S809 to S811 are performed in accordance with the user operation of S808 and the job is printed. Further, a job acquisition process by the user operation of S808 and thereafter may be performed only once after the image forming apparatus 101 is powered on.

Figure 9A:
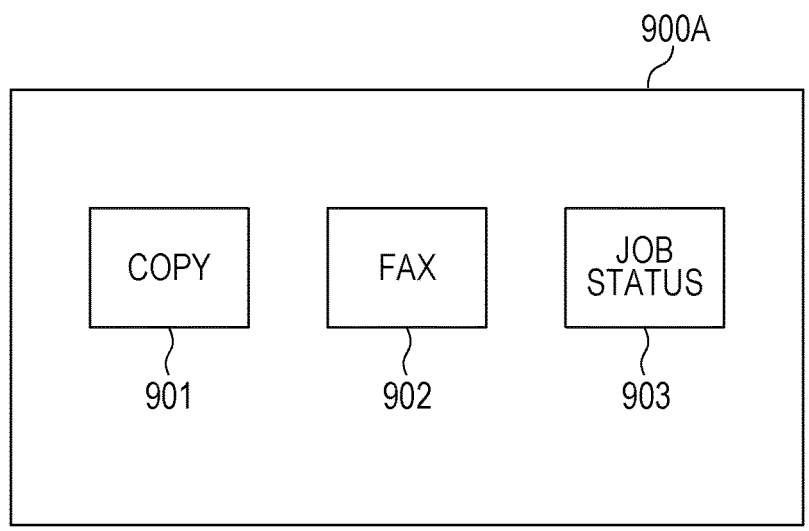
FIGS. 9A and 9B illustrate a user operation.
Figure 9B:
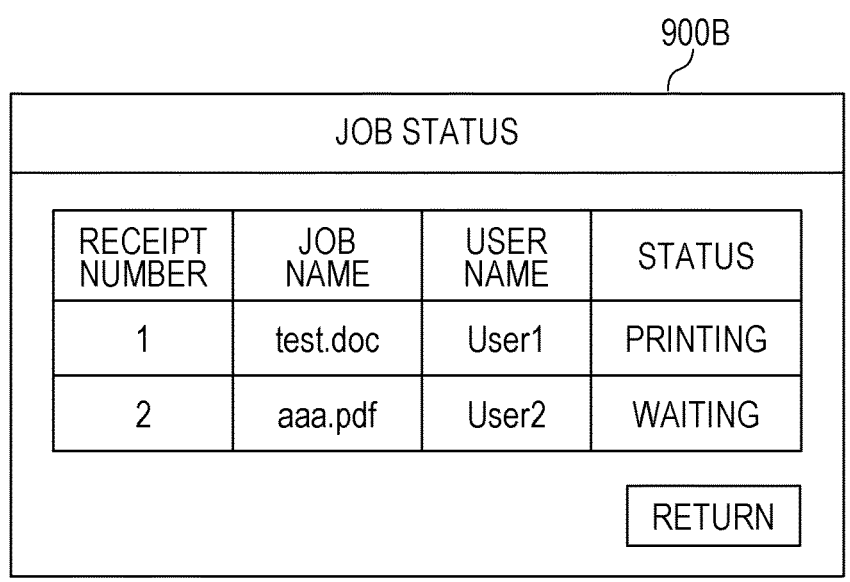

FIGS. 9A and 9B illustrate the user operation of S808 of the sequence of FIG. 8.

The reference numeral 900A denotes an operation screen displayed on the operation panel 211 of the image forming apparatus 101. On the operation screen 900A, a button 901 for using a copy function, a button 902 for using a facsimile function, a button 903 for displaying the current job status, etc., are displayed. When the user presses the button 903, the image forming apparatus 101 makes the display transition to a job status screen 900B. The operation of pressing the button 903 by the user corresponds to S808 of FIG. 8, and the image forming apparatus 101 proceeds the process to S809 and thereafter by this operation.

The user operation described in FIGS. 9A and 9B is illustrative only, and the user operation corresponding to S808 of FIG. 8 is not limited to pressing of the button 903 for transition to the job status screen 900B. Another user operation may be a pressing operation of the button 901 or 902 for using copy or facsimile. The buttons do not necessarily have to be those on the touch panel (soft keys) as illustrated in FIG. 9A but may be hard keys. The user operation may include a user operation to provide the image forming apparatus 101 with an instruction from a web browser etc. not on the image forming apparatus 101 but via a network. For example, the CPU 202 of the image forming apparatus 101 is assumed to have a function to provide an external device, such as a PC connected via the LAN I/F 212, with a user interface (a remote UI) of the image forming apparatus 101. A user operation from the remote UI detected by the image forming apparatus 101 may be the user operation corresponding to S808 of FIG. 8.

Figure 10:
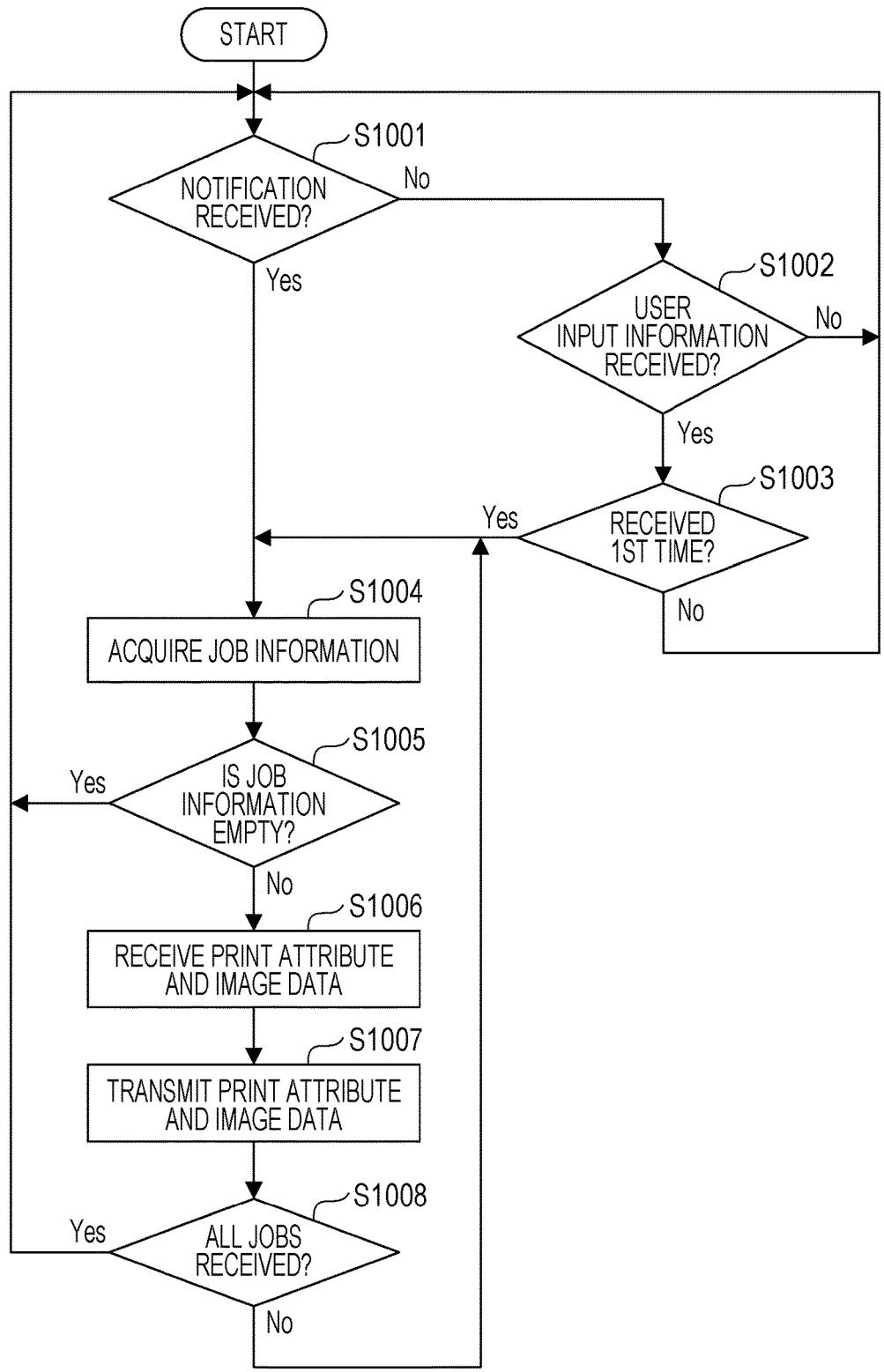
FIG. 10 is a flowchart of a process of a job acquisition unit in the first embodiment.

FIG. 10 is a flowchart of a process of the job acquisition unit 302 in the first embodiment. This flowchart describes the processes of S804 to S811 of FIG. 8 in detail. Each step in the flowchart of FIG. 10 is processed when the CPU 202 of the image forming apparatus 101 develops a program stored in the memory, such as the ROM 204 and the HDD 205, to the RAM 203 and executes the program.

In S1001, the job acquisition unit 302 determines whether the job notification information is received from the job notification receiving unit 301. If it is determined that the job notification information is received (S1001: Yes), the job acquisition unit 302 proceeds the process to S1004.

If it is determined that no job notification information is received (S1001: No), the job acquisition unit 302 proceeds the process to S1002.

In S1002, the job acquisition unit 302 determines whether the user input information is received from the user input receiving unit 303. If it is determined that no user input information is received (S1002: No), the job acquisition unit 302 returns the process to S1001.

If it is determined that user input information is received (S1002: Yes), the job acquisition unit 302 proceeds the process to S1003.

In S1003, the job acquisition unit 302 determines whether the times of receipt of the user input information reaches a prescribed number of times. In the present embodiment, the prescribed number of times is 1 after start-up of the image forming apparatus 101, but the prescribed number of times is not limited to 1 and may be determined arbitrarily. The prescribed number of times may be determined arbitrarily on the operation panel 211 or the above-described remote UI. Alternatively, no prescribed number of times may be defined at all. In the image forming apparatus 101, the number of times of receipt of the user input information after start-up of the image forming apparatus 101 is assumed to be stored in the RAM 203, for example.

If it is determined that the receipt of the user input information is the second time or thereafter (not the first time) (S1003: No), the job acquisition unit 302 returns the process to S1001.

If it is determined that the receipt of the user input information is the first time (S1003: Yes), the job acquisition unit 302 proceeds the process to S1004.

In S1004, the job acquisition unit 302 transmits a job information acquisition request to the cloud server 102 and receives job information as a response. The job information received here is, for example, job information 1100 illustrated in FIG. 11.

Next, in S1005, the job acquisition unit 302 checks whether the job information acquired in S1004 is empty. If it is determined that the job information is empty (S1005: Yes), the job acquisition unit 302 returns the process to S1001.

If it is determined that the job information is not empty (S1005: No), the job acquisition unit 302 proceeds the process to S1006.

In S1006, the job acquisition unit 302 extracts a URL with which a print attribute can be acquired and a URL with which image data can be acquired from the information of a first job included in the job information 1100 received in S1004, and receives a print attribute and image data from each URL.

Next, in S1007, the job acquisition unit 302 transmits the print attribute and the image data received in S1006 to the job control unit 304. Therefore, printing in accordance with the print attribute and the image data received in S1006 is performed by the job control unit 304.

Next, in S1008, the job acquisition unit 302 determines whether receipt of all the jobs included in the job information 1100 received in S1004 is completed. If it is determined that receipt of all the jobs is not completed yet (S1008: No), the job acquisition unit 302 returns the process to S1004.

If it is determined that receipt of all the jobs is completed (S1008: Yes), the job acquisition unit 302 returns the process to S1001.

The prescribed number of times in S1003 is 1 in the present embodiment, but the prescribed number of times may be determined arbitrarily. Alternatively, no prescribed number of times may be defined at all. In the case where no prescribed number of times is defined, the job acquisition unit 302 skips S1003 if the determination result is Yes in S1002 and proceeds the process to S1004.

Figures 11, 12:
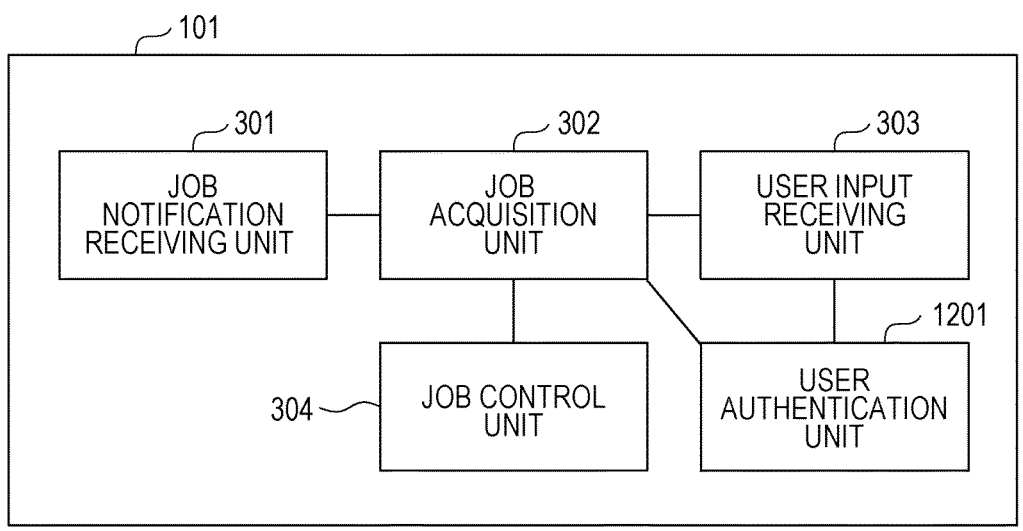
FIG. 11 illustrates job information received from the cloud server.
FIG. 12 is a software configuration diagram of an image forming apparatus according to a second embodiment.

FIG. 11 illustrates job information 1100 received from the cloud server 102.

Information about a plurality of jobs may be included in the job information 1100. Each of the jobs included in the job information 1100 includes a job identifier 1101, a job name 1102, a user name 1103 of a user who submitted the job, a URL 1104 with which a print attribute can be acquired, a URL 1105 with which image data can be acquired, a current job state 1106, etc.

As described above, the image forming apparatus 101 of the first embodiment which performs cloud printing monitors both the receipt of a notification from the cloud server 102 and the receipt of a predetermined user operation and, when either of them occurs, transmits a print job acquisition request to the cloud server 102 and acquires the print job, and prints the acquired print job.

With this configuration, even if a situation where the image forming apparatus 101 cannot acquire a job notification from the cloud server 102 due to, for example, powering-off of the image forming apparatus 101 is created, the image forming apparatus 101 can acquire a print job from the cloud server 102 in accordance with a user operation and perform printing.

The situation where no notification is transmitted from a server is that, for example, the server does not satisfy notification conditions, such as a notification period. In a server which issues notifications at a constant period, no notification is issued until predetermined timing comes. Since acquisition of print data can be started in accordance with a user operation in the present embodiment, it is unnecessary for the user to wait for the receipt of the print job until a notification arrives.

The situation where no notification is transmitted from a server is that, for example, the server and the image forming apparatus cannot communicate temporarily. In the server which issues a notification to the image forming apparatus at timing at which a job is submitted from the client terminal, the notification cannot be normally completed with respect to the image forming apparatus which is powered off at this timing. Therefore, the image forming apparatus cannot receive a notification nor receive a job. According to the present embodiment, since acquisition of print data can be started in accordance with a user operation, a print job about which no notification was able to be acquired also can be acquired.

The situation where no notification is transmitted from a server is that, for example, the notification is already completed. A situation where the notification is completed whereas printing is not completed may be created if the printing is interrupted due to, for example, powering-off of the image forming apparatus during downloading of the job after the notification is received from the server. In this situation, no more notification is issued because issuance of the notification is normally completed by the server. Therefore, the job cannot be received. According to the present embodiment, since acquisition of print data can be started in accordance with a user operation, a print job about which notification is already acquired also can be acquired.

In the present embodiment, receipt of a print job is not started until the user operation is performed. Therefore, a situation where a printed matter is output at unintended timing and the user forgets to take the output printed matter is created can be avoided. In the present embodiment, receipt of print data is not automatically started only by powering-on of the image forming apparatus 101. Therefore, an operation of a user who wants to use the image forming apparatus 101 for other purposes than printing is not disturbed.

Second Embodiment

In a second embodiment, the image forming apparatus 101 has a user authentication function, and performs a job acquisition process from the cloud server 102 in relation to a login process to the image forming apparatus 101. With this configuration, it is possible to allow printing of a job of a log-in user, and to acquire a job at the time of login and print.

In the description of the present embodiment, the same configurations as those of the first embodiment are not described repeatedly, and a difference will be described.

FIG. 12 illustrates a software configuration of the image forming apparatus 101 in the second embodiment. Each function part illustrated in FIG. 12 is implemented when the CPU 202 executes the control program stored in the ROM 204 and the HDD 205. The same components as those illustrated in FIG. 3 are denoted by the same reference numerals, and parts different from those of the first embodiment will be described.

A user authentication unit 1201 manages information of users who can use the image forming apparatus 101. When a user inputs user authentication information, for example, from the operation panel 211 at the time of using the image forming apparatus 101, the user authentication unit 1201 authenticates the user based on the input information received from the user input receiving unit 303. The authentication methods may include entering a user name and a password from the operation panel 211, or using an IC card.

When user authentication by the user authentication unit 1201 is completed successfully, the user input receiving unit 303 transmits the user input information to the job acquisition unit 302. Alternatively, the user input receiving unit 303 may transmit the user input information to the job acquisition unit 302 in a subsequent user operation after authentication (pressing of the button 903 of FIG. 9A) as in the first embodiment not when authentication is completed successfully.

Further, the job acquisition unit 302 can acquire a user name of a currently log-in user from the user authentication unit 1201, and acquire only a job of the currently log-in user from the job information received from the cloud server 102.

Figure 13:
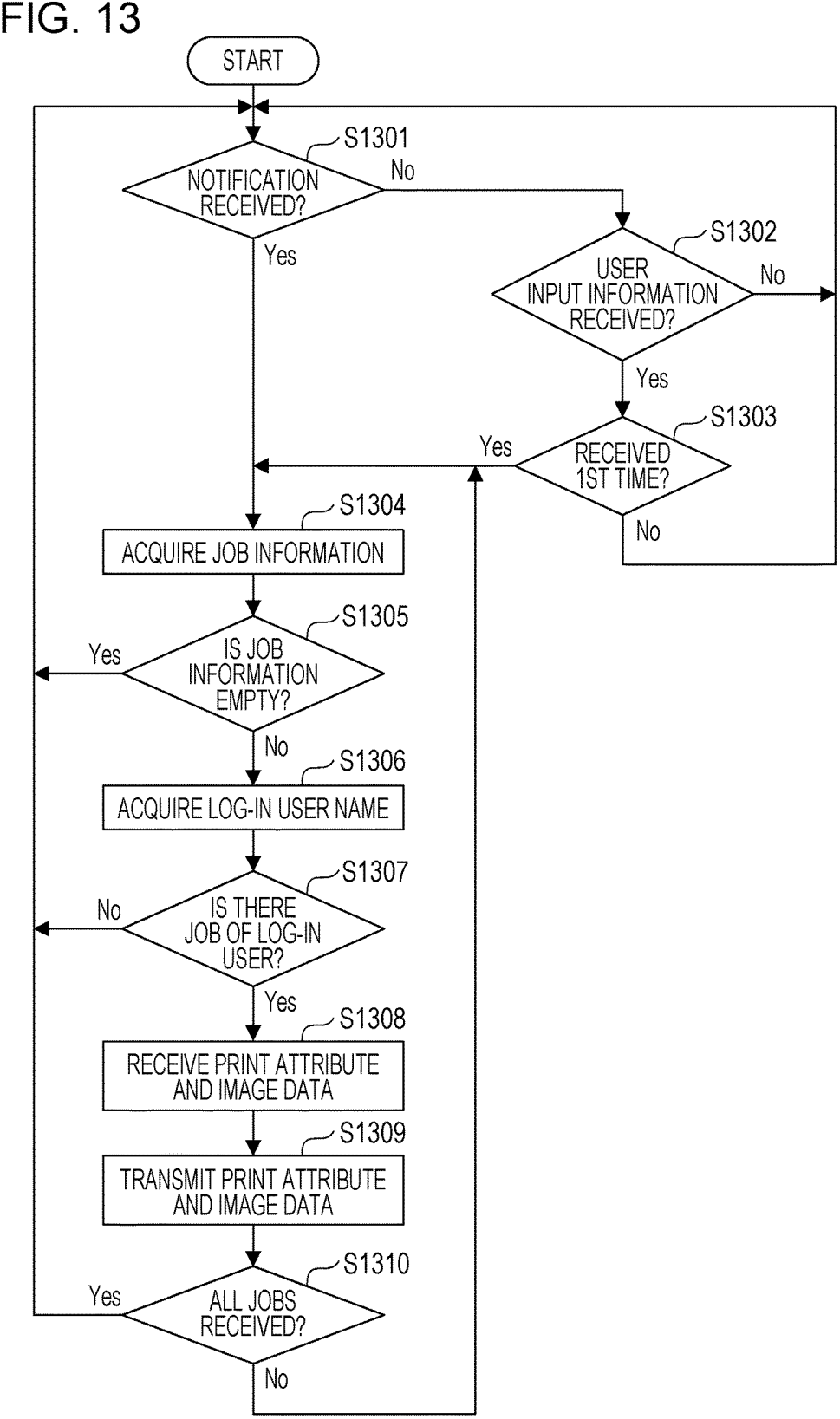
FIG. 13 is a flowchart of a process of a job acquisition unit in the second embodiment.

FIG. 13 is a flowchart of a process of the job acquisition unit 302 in the second embodiment. Each step in the flowchart of FIG. 13 is processed when the CPU 202 of the image forming apparatus 101 develops a program stored in the memory, such as the ROM 204 and the HDD 205, to the RAM 203 and executes the program.

First, processes of S1301 to S1303 are the same as those of S1001 to S1003 of FIG. 10 and are not described. However, the user input information determined in S1302 and S1303 may be received when authentication of the user is completed successfully, or may be received when the user operation is performed after authentication as in the first embodiment.

Processes of S1304 and S1305 are the same as those of S1004 and S1005 of FIG. 10 and are not described.

Next, in S1306, the job acquisition unit 302 acquires a user name of a currently log-in user from the user authentication unit 1201.

Next, in S1307, the job acquisition unit 302 determines whether a job corresponding to the user name acquired in S1306 exists in the job information received in S1304. If it is determined that no job corresponding to the user name acquired in S1306 exists (S1307: No), the job acquisition unit 302 returns the process to S1301.

If it is determined that a job corresponding to the user name acquired in S1306 exists (S1307: Yes), the job acquisition unit 302 proceeds the process to S1308.

In S1308, the job acquisition unit 302 extracts a URL with which a print attribute can be acquired and a URL with which image data can be acquired from job information corresponding to the user name acquired in S1306, and receives a print attribute and image data from each URL.

Next, in S1309, the job acquisition unit 302 transmits the print attribute and the image data received in S1308 to the job control unit 304. Therefore, printing in accordance with the print attribute and the image data received in S1308 is performed by the job control unit 304.

Next, in S1310, the job acquisition unit 302 determines whether receipt of all the jobs corresponding to the user name acquired in S1306 included in the job information 1100 received in S1304 is completed. If it is determined that receipt of all the jobs corresponding to the user name is not completed yet (S1310: No), the job acquisition unit 302 returns the process to S1304.

If it is determined that receipt of all the jobs corresponding to the user name is completed (S1310: Yes), the job acquisition unit 302 returns the process to S1301.

In a state where any of the users logs in the image forming apparatus 101, the job acquisition unit 302 skips S1306 and S1307, and sets the jobs of all the users to be acquisition targets in S1308. The job acquisition unit 302 determines in S1310 whether receipt of all the jobs in the received job information 1100 is completed.

The prescribed number of times determined in S1303 is 1 in the present embodiment, but the prescribed number of times may be determined arbitrarily. Alternatively, no prescribed number of times may be defined at all. In the case where no prescribed number of times is defined, the job acquisition unit 302 skips S1303 if the determination result is Yes in S1302 and proceeds the process to S1304.

In S1303, the prescribed number of times may be determined for each user. In this configuration, the job acquisition unit 302 determines whether the times of receipt of the user input information is equal to or less than the prescribed number of times about the log-in user in S1303. In this case, in the image forming apparatus 101, the number of times of receipt of the user input information after start-up of the image forming apparatus 101 is assumed to be stored in the RAM 203, for example, for each user.

As described above, the image forming apparatus 101 of the second embodiment has a user authentication function. The image forming apparatus 101 of the second embodiment monitors receipt of notification from the cloud server 102 and generation of user authentication. That is, the image forming apparatus 101 monitors a user operation attempting to make user authentication (i.e., generation of a predetermined operation). When notification from the cloud server 102 is received or when user authentication is completed successfully, the image forming apparatus 101 requests the cloud server 102 to transmit a print job. The image forming apparatus 101 which acquired the print job transmitted from the cloud server 102 prints the print job. The image forming apparatus 101 has a configuration for performing a series of processes described above. With this configuration, no inconvenience is caused even if a situation where the image forming apparatus 101 cannot receive a job notification from the cloud server 102 due to, for example, powering-off of the image forming apparatus 101 is created. In particular, the image forming apparatus 101 requests the cloud server 102 to transmit a print job in response to a user operation, such as a login. Therefore, a job about which no notification was able to be acquired can be acquired from the cloud server 102 and printed. The acquisition request of a print job in the image forming apparatus 101 is issued when a user operation, such as a login, is performed (as a trigger). Therefore, if the image forming apparatus 101 is powered on for other purposes than printing, no acquisition request of a print job is issued. Therefore, an acquisition request of a print job does not disturb other purposes of use of the user.

The configurations of the various types of data and contents thereof described above are not limited to the same, and may be configured variously depending on applications and purposes.

Although one embodiment is described above, embodiment may be implemented as, for example, a system, an apparatus, a method, a program, or a storage medium. An embodiment may be applied to a system constituted by a plurality of apparatuses or an apparatus constituted by a single device.

All the configurations in which the embodiments described above are combined also are part of the present disclosure.

In an example, a print system is provided in which the image forming apparatus can acquire a print job from the server and print even if a situation where the server cannot provide a job notification to the image forming apparatus due to, for example, powering-off of the image forming apparatus is created, and in which there is no possibility of disturbing the use of the image forming apparatus by a user who wants to use the image forming apparatus by powering on, etc.

Other Embodiments

Embodiment(s) also can be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to embodiments, it is to be understood that the invention is not limited to the disclosed embodiments. The scope of the following claims is to be accorded the broadest interpretation so as to encompass all such modifications and equivalent structures and functions.

This application claims the benefit of Japanese Patent Application No. 2016-038736 filed Mar. 1, 2016, which is hereby incorporated by reference herein in its entirety.

What is claimed is:

1. An image forming apparatus to communicate with an external device which manages print data, the image forming apparatus comprising:
   at least one processor;
   a job notification receiving unit implemented by the at least one processor and configured to receive a job notification;
   an operation panel configured to receive a user input operation of a user operating the operation panel;
   a job acquisition unit implemented by the at least one processor and configured to acquire print data and to monitor receipt of a job notification at the same time as monitoring receipt of a user input operation;
   a printer configured to print a job;
   a determination unit implemented by the at least one processor and configured to determine a number of user input operations received after the image forming apparatus is started up; and
   a controller configured to perform control,
   wherein, in a case where the job notification receiving unit receives, from the external device, the job notification first after start-up of the image forming apparatus, the controller performs control so that the job acquisition unit acquires unacquired print data from the external device,
   wherein, in a case where print data is ready to be acquired from the external device and no job notification encouraging acquisition of the print data is received from the external device first after start-up of the image forming apparatus,
   the controller performs control so that, in a case where the determination unit determines that a first user input operation is received after the image forming apparatus is started up, the job acquisition unit transmits a data acquisition request regarding the job to the external device and, in response, acquires unacquired print data from the external device, and the controller performs control so that, in a case where the determination unit determines that a second or subsequent user input operation is received after the image forming apparatus is started up, a data acquisition request regarding the job is not transmitted to the external device and print data is not again acquired from the external device in response to the second or subsequent user input operation.

2. The image forming apparatus according to claim 1, wherein, in a case where the operation panel receives the user input operation after a connection with the external device is established, the controller acquires unacquired print data from the external device and the printer prints out a print job based on any acquired print data.

3. The image forming apparatus according to claim 2, wherein, upon start-up of the image forming apparatus, the controller establishes a connection with the external device.

4. The image forming apparatus according to claim 1,
wherein the operation panel includes a plurality of buttons for receiving user input operations, and
wherein, in a case where the operation panel receives a user input operation by a predetermined button among the plurality of buttons, the controller acquires unacquired print data from the external device.

5. The image forming apparatus according to claim 1,
wherein the operation panel includes a hard key, and
wherein, in a case where the operation panel receives a user input operation by the hard key, the controller acquires unacquired print data from the external device.

6. The image forming apparatus according to claim 1,
wherein the controller further is configured to execute instructions to cause a display to display information, and
wherein, in a case where the operation panel receives a user input operation of making a predetermined screen be displayed on the display, the controller acquires unacquired print data from the external device.

7. The image forming apparatus according to claim 6, wherein the predetermined screen is a job status screen for checking a current job status.

8. The image forming apparatus according to claim 1, wherein, in a case where the operation panel receives a user input operation for authenticating a user, the controller acquires unacquired print data from the external device.

9. The image forming apparatus according to claim 8, wherein, in a case where the authentication is completed successfully, the controller requests the external device to provide print data corresponding to an authenticated user.

10. The image forming apparatus according to claim 8,
wherein, in a case where the number of times that a predetermined user input operation is received in the operation panel is equal to or less than a prescribed number of times after start-up of the image forming apparatus, the controller acquires the print data from the external device, and
wherein, in a case where the number of times that predetermined user input operation is received in the operation panel is greater than the prescribed number of times after start-up of the image forming apparatus, the controller does not acquire unacquired print data from the external device.

11. The image forming apparatus according to claim 10, wherein the prescribed number of times is one.

12. The image forming apparatus according to claim 10, wherein the controller receives setting of the prescribed number of times.

13. The image forming apparatus according to claim 1, wherein the unacquired print data is print data for which the job notification is received but acquisition of the unacquired print data from the external device is not yet completed.

14. The image forming apparatus according to claim 1, wherein the controller causes the printer to form an image from the acquired print data on a sheet and the image forming apparatus outputs the sheet.

15. The image forming apparatus according to claim 1,
wherein the user input operation includes a request from the user to acquire print data from the external device,
wherein the unacquired print data is a first print data in the external device not already acquired by the image forming apparatus from the external device, and
wherein, in a case where the controller performs control so that a data acquisition request regarding the job is not transmitted to the external device, the controller performs control whereby the first print data is acquired only once from the external device and communications with the external device to acquire the first print data occur only once, even where the image forming apparatus receives a user input operation in a state in which no job for the image forming apparatus is stored at a server.

16. A method for an image forming apparatus to communicate with an external device which manages print data, wherein the image forming apparatus includes at least one processor, a job notification receiving unit implemented by the at least one processor and configured to receive a job notification, an operation panel configured to receive a user input operation of a user operating the operation panel, and a printer configured to print a job, the method comprising:
acquiring print data and monitoring receipt of a job notification at the same time as monitoring receipt of a user input operation;
determining a number of user input operations received after the image forming apparatus is started up; and
performing control,
wherein, in a case where the job notification receiving unit receives, from the external device, the job notification first after start-up of the image forming apparatus, performing control includes acquiring unacquired print data from the external device,
wherein, in a case where print data is ready to be acquired from the external device and no job notification encouraging acquisition of the print data is received from the external device first after start-up of the image forming apparatus,
performing control includes performing control so that, in a case where it is determined that a first user input operation is received after the image forming apparatus is started up, a data acquisition request regarding the job is transmitted to the external device and, in response, unacquired print data is acquired from the external device, and
performing control includes performing control so that, in a case where it is determined that a second or subsequent user input operation is received after the image forming apparatus is started up, a data acquisition request regarding the job is not transmitted to the external device and print data is not again acquired from the external device in response to the second or subsequent user input operation.

17. A non-transitory storage medium storing a program to cause a computer to perform a method for an image forming apparatus to communicate with an external device which manages print data, wherein the image forming apparatus includes at least one processor, a job notification receiving unit implemented by the at least one processor and configured to receive a job notification, an operation panel configured to receive a user input operation of a user operating the operation panel, and a printer configured to print a job, the method comprising:

acquiring print data and monitoring receipt of a job notification at the same time as monitoring receipt of a user input operation;

determining a number of user input operations received after the image forming apparatus is started up; and performing control, wherein, in a case where the job notification receiving unit receives, from the external device, the job notification first after start-up of the image forming apparatus, performing control includes acquiring unacquired print data from the external device, wherein, in a case where print data is ready to be acquired from the external device and no job notification encouraging acquisition of the print data is received from the external device first after start-up of the image forming apparatus, performing control includes performing control so that, in a case where it is determined that a first user input operation is received after the image forming apparatus is started up, a data acquisition request regarding the job is transmitted to the external device and, in response, unacquired print data is acquired from the external device, and performing control includes performing control so that, in a case where it is determined that a second or subsequent user input operation is received after the image forming apparatus is started up, a data acquisition request regarding the job is not transmitted to the external device and print data is not again acquired from the external device in response to the second or subsequent user input operation.

* * * * *